March 26, 1957 P. SPENCE 2,786,487
DOUBLE-SEATED VALVE
Filed Nov. 8, 1951 2 Sheets-Sheet 1
FIG. I.
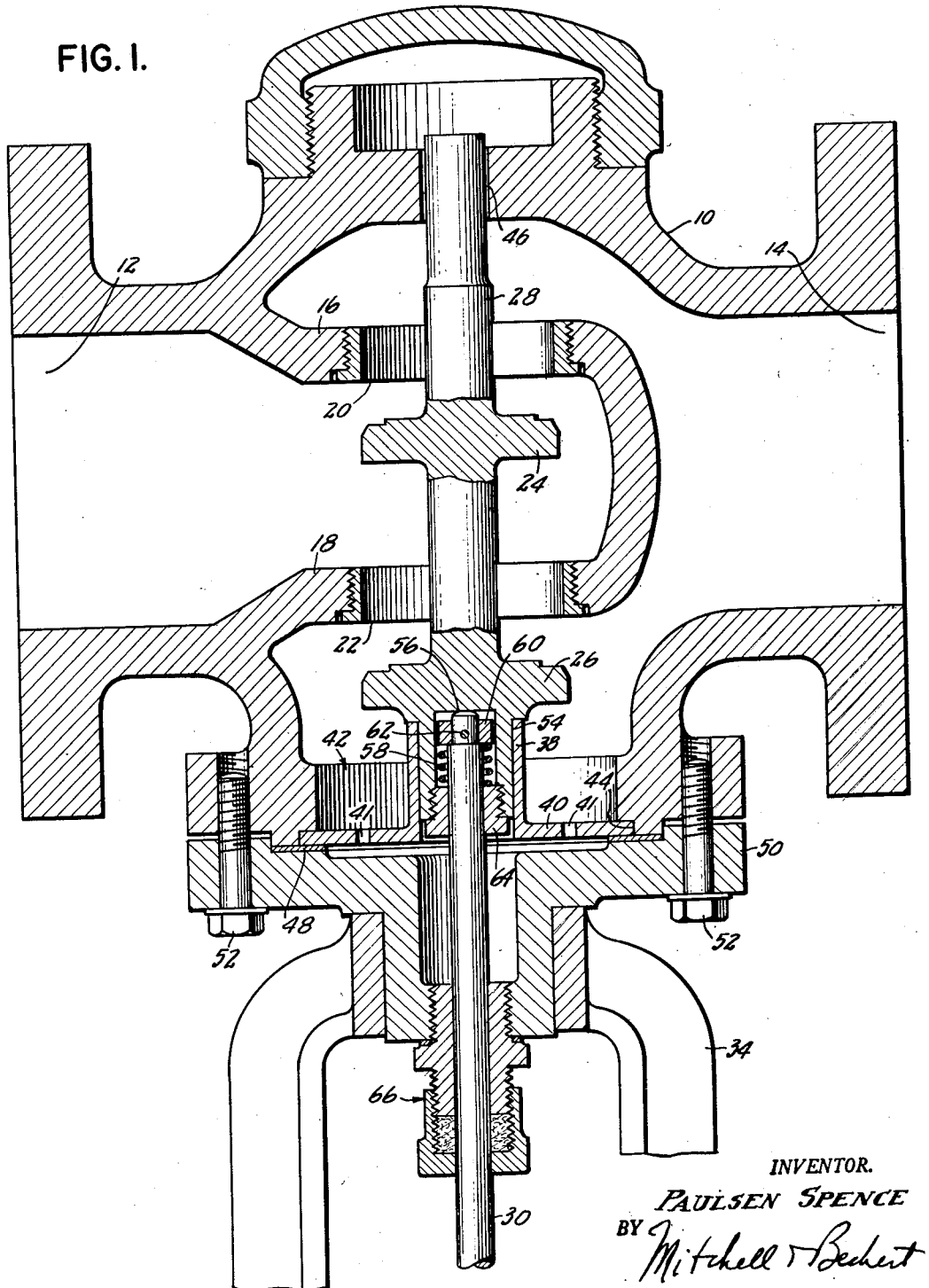
INVENTOR.
PAULSEN SPENCE
BY
Mitchell & Bechert
ATTORNEYS March 26, 1957
P. SPENCE
2,786,487
DOUBLE-SEATED VALVE
Filed Nov. 8, 1951
2 Sheets-Sheet 2
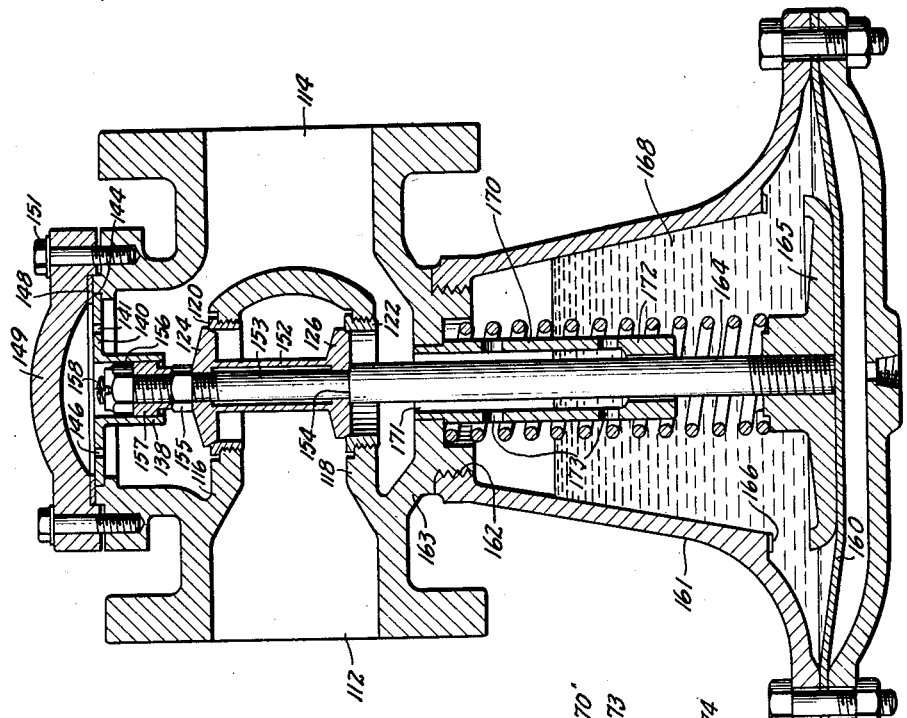
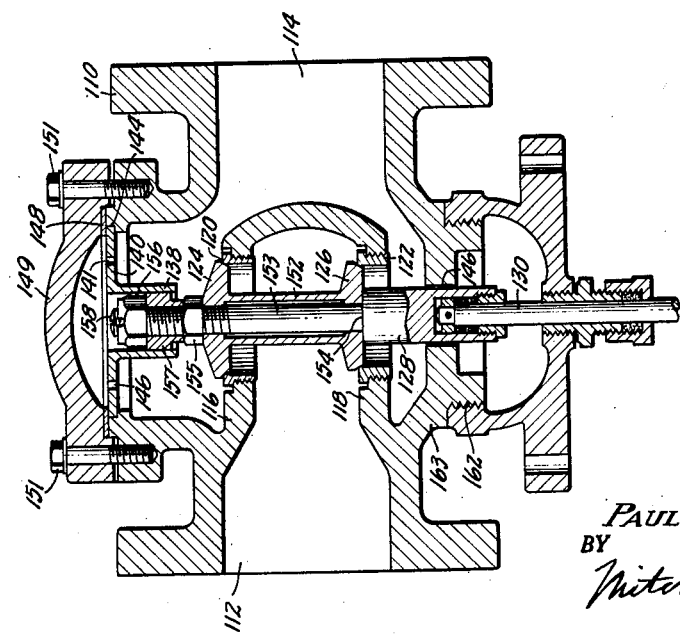
INVENTOR.
PAULSEN SPENCE
BY
Mitchell & Bechert
ATTORNEYS

2,786,487

DOUBLE-SEATED VALVE

Paulsen Spence, Baton Rouge, La.

Application November 8, 1951, Serial No. 255,451

3 Claims. (Cl. 137—625.36)

My invention relates to valves and, in particular, to double-ported valves in which there is a requirement for great accuracy in the concentric seating of the valve discs.

The present application is a continuation-in-part of my earlier application, Serial No. 669,178, filed May 11, 1946, and abandoned December 4, 1951.

To make for ready assembly and disassembly of double-ported valves, it has been customary to make one of the discs smaller than the valve-seat opening for the other disc, whereby an assembly of discs on the valve stem may be inserted as a unit into the valve seats. This procedure requires that a rather large opening be left in the valve body to permit introduction of the assembled valve-operating elements. There follows then a problem of providing suitable guide means for the exposed part of the valve stem at the side of the body on which the large opening exists. Previously, this guide means has been so awkward that the point of guiding support is substantially spaced from the operating position of the valve, so that it has been usual to fabricate the valve stem from two pieces, threading one into the other. Such structure is susceptible to misalignment difficulties and, clearly, the distant point of support is not desirable in some applications.

It is, accordingly, an object of my invention to provide an improved double-ported valve structure.

It is another object to provide an improved guide means for a valve stem.

It is also an object to provide improved means for supporting the operating elements of a double-ported valve.

It is a further object to provide improved means for sealing valves in which a valve-stem guide is inserted after insertion of the valve stem.

It is a specific object to provide an improved valve construction wherein not only may there be aligned guided support of the valve stem on both sides of the valve members, but all valve-member parts may be immediately accessible for removal or replacement, merely upon removal of a single bonnet member, and without disturbing the assembly or the setting of the valve-actuating means.

Another specific object is to provide non-sticking valve-guide means in constructions of the character indicated, whereby smooth operation may be assured even when the valve is subjected to very high pressures.

Other objects and various further features of the invention will hereinafter be pointed out or will appear from a reading of the following specification, in conjunction with the accompanying drawings, in which:

Fig. 1 is a vertical sectional view of a valve, incorporating features of my invention;

Fig. 2 is a fragmentary section of a modified form of valve according to the invention;

Fig. 3 is a section of a further modified form of the valve according to the invention; and Fig. 4 is a fragmentary sectional view of an alternative construction of a part of the valve of Fig. 3.

Broadly speaking, my invention seeks to assure concentricity and accuracy of the seating and other operation of a double-ported valve by providing accurately machined valve-stem supports or guides in close proximity with the operating positions of the valve. In the form to be specifically described, valve-actuator means are operatively connected to a single-piece valve stem virtually at the point of support of said stem, and this connection is a flexible or loose one, whereby axial misalignment of the actuating means with respect to the valve stem cannot impair accurate seating and other operation of the valve. The guide adjacent the larger valve disc is nested in a locating ring or seat on the valve body; this ring is preferably machined at the same time as the other valve-stem guide and the valve-seat openings are machined, whereby complete concentricity of all operating members is assured. Improved sealing means are also provided for sealing the interfit of the sleeve member with the valve body at the locating ring or seat.

The valve member may be removably mounted on the valve stem in such a way as to provide quick replacement of the valve member or members with minimum dismantling, as by the mere removal of a bonnet. This feature may be realized while maintaining proper concentric, guided alignment of the valve member on both sides thereof; and, while the members are being removed, there need be no disturbance of the assembly or setting of the valve-actuating means. In application to high-pressure steam or other valves where there may be tendencies for a closely guided fit to become gummed and therefore sticky, I have provided means for virtually eliminating the accumulation of gum, so that smooth operation may be assured at all times.

Referring to Fig. 1, my invention is shown applied to a double-ported valve having a valve body 10, an inlet 12, and an outlet 14. The valve body 10 is formed with upper and lower partitions 16 and 18, having seats 20 and 22, respectively, for coaction with the valve discs or members 24 and 26 carried by a stem 28. The seats 20—22 may be threaded inserts in the partitions 16—18, and the upper disc 20 is of a size to pass through the opening in the lower seat 22. In the form shown, the valve stem 28 is displaced by actuating means including a connecting rod 30. The elements thus far described, including a standard 34 for support of an actuating means (not shown), are conventional and well known in the art.

According to one feature of the invention, I provide improved means for supporting the end of the valve-stem 28 adjacent the lower, and larger, valve seat 22. This improved support, in the form shown, comprises a sleeve member 38 having a flange 40 concentric therewith. Flange 40 extends radially to span the relatively large opening 42 in the valve body. Flange 40 may be provided with apertures 41 to provide essentially no pressure differential across flange 40. To assure concentricity of the sleeve 38 with respect to seats 20 and 22, the flange 40 is nested in a locating ring or seat 44. Preferably, the locating-seat 44 is machined into the valve body 10, at the same time as are the valve-seat openings and the upper guide 46 for the small end of the valve stem 28.

In the form shown, the outer and otherwise exposed surfaces of flange 40 and valve body 10 are coplanar in the region of locating ring 44. This arrangement makes possible the employment of a single sealing member, such as a gasket 48, to overstand the line of interfit between these members. Gasket 48 may be rendered effective as a seal by clamping the base 50 of standard 34 to the valve body 10, as by means of bolts 52. It will be clear that with the seal arrangement described, it is possible in one operation effectively to seal against leakage of high pressures from either side of the flange 40 and that the sealing means in no way interferes with the accurate concentric placement of sleeve 38 with respect to the members.

As indicated above, I employ a loose-jointed mechanism for attachment of the actuating means 30 to the valve stem 28, and this joint is effected substantially at a point of support of the valve stem. In the form shown, the lower end of the valve stem 28 is provided with an outer surface 54, slidingly coating with the sleeve 38, and this end is also bored to receive the free-joint connecting means. In the event of possible misalignment of the actuating means 30, with the valve stem 28, actuator 30 is provided at its thrust end with a generally spherical surface 56 for more effective transfer of purely axial thrust to the valve stem 28. The actuator 30 is resiliently held in this position by means of a spring 58 compressed for abutment on the one hand with a collar 60 secured (as by a pin 62) to the actuator 30 and, on the other hand, with a guide bushing 64 threadedly engaging the bore of stem 28. Conventional means, such as a stuffing box 66, may be employed to position and to seal off the actuating means 30.

In Fig. 2, the features of my invention are shown applied to a modified form of double-ported valve. The valve includes a valve body 110, having an inlet 112, an outlet 114, and two partitions 116 and 118. In contrast to the structure described for Fig. 1, the larger valve-seat 120 (in the valve of Fig. 2) is above the smaller seat 122. The valve discs 124 and 126 cooperating with these seats are of such size that the assembly of discs on the stem 128 may be removed upward through the seat 120 and disassembled. Support for the lower stem 128 is provided in a guide 146, and my novel guide-locating and sealing means is applied to the upper end of stem 128. Again, this novel guide is shown to comprise a sleeve 138, having a flange 140 concentric therewith. The flange 140 is preferably nested in a locating ring-seat 144 in the valve body 110, and the outer surfaces of the valve body and of the flange are flush or essentially coplanar to permit employment of a single gasket or sealing member 148. A body casing member or bonnet 149 may be secured as by bolts 151 to the valve body 110 to render the sealing means effective, as will be clear. Flange 140 is preferably provided with apertures 141 to permit the free admission of pressure fluid to both sides of the flange, whereby cushioning of the sliding operation of valve stem 128, within the sleeve 138, is rendered negligible.

The actuating means for the valve of Fig. 2 may be generally similar to that of Fig. 1, the actuating forces being applied to the lower end of valve stem 128. The flexible or loose-joint mechanism and the arrangement for transferring thrusts from the actuator 130 to the valve stem 128 will be recognized as generally similar to those shown for the valve of Fig. 1.

It is a feature of the construction of Fig. 2 that the valve member means 124—126 may be readily removed without disturbing other parts of the assembly, merely upon removal of the bonnet 149. In the form shown, the valve-member means 124—126 comprises a spool 152, with the respective members 124—126 integrally formed therewith. The valve-member assembly is removably supported on a reduced part 153 of the valve stem, and seated against a shoulder 154 on the valve stem. A nut 155 on the threaded end of the valve stem holds the valve member in place, and a second or lock nut 156 retains a guide boss 157 for guided coaction with the guide sleeve 138. The end of the stem 153 may be slotted as at 158 to receive a screw-driver or other tool when setting the nut 156. It will be clear that, upon removal of the bonnet 149, the flange guide 138 may be merely lifted out so as to expose the securing means 155—156. Upon removal of such securing means, the valve-member spool 152 may be lifted out and, if necessary, replaced, all without disturbing connections to the actuating means.

It will be noted that the lower end of the guide sleeve 138 cooperates with the upper surface of the valve member 124 to form a stop. This stop determines the upper limit of travel of the valve, and assures the guided support of the stem on both sides of the valve members and for the full travel of the valve members.

In Fig. 3, I show a further adaptation of the principles of the invention to a double-ported valve construction, incorporating a flexible diaphragm 160 as the actuating means. The diaphragm 160 may be supported peripherally at the end of a tubular connection 161, threadedly joined at 162 to the valve body 163 and defining a fluid-tight chamber 168 above the diaphragm 160. The valve stem may be of single-piece construction 164, supporting a diaphragm-reinforcing member 165 at the lower end. The member 165 is preferably sufficiently radially extensive to overstand an internal rim 166, formed in the tubular member 161, so that the rim 166 may provide a definite limit to the travel of the valve. The total valve-travel determined by member 165 and rim 166 is preferably such as to allow full guided support of the valve stem on both sides of the valve members at all times.

When a valve such as that of Fig. 3 is used in the control of high-pressure steam, there is a strong tendency for a gummy deposit to accumulate on the downstream side—that is, on the valve stem 164. If the stem is guided near the body, such gummy deposits may interfere with otherwise smooth operation of the valve; but, in the form shown, I avoid such difficulties by providing downstream guided support of the stem below the surface of condensate accumulated within chamber 168 defined by tubular member 161. For this purpose, I have provided an elongated sleeve 170, carried directly by the body 163, and for the most part very amply clearing the valve stem, as indicated by the large radial clearance at 171. The guide sleeve 170 preferably extends well into chamber 168 and, therefore, into the condensate, and may be provided at its lower end with an integral guide boss 172, relatively closely fitting the stem 164. The sleeve 170 may be provided with a plurality of openings 173, so as to promote a free-flooding of the fit between the guide boss 172 and the stem 164. In operation, any tendencies to produce and accumulate gum on the valve stem 164 will occur above the surface of the condensate. Gums reaching this level will merely go into solution in the condensate and, therefore, will have no opportunity to harden on the stem in the vicinity of the guide boss 172. The valve will, therefore, remain clean and smoothly operating over extended periods.

In Fig. 4, I show a slightly modified construction for the lower end of a guide sleeve 170', corresponding to the sleeve 170 of Fig. 3. In this construction a guide bushing 174, which may be of a different material than that of the sleeve 170, is carried at the end of the sleeve 170', to provide the necessary close, guided support of the stem 164.

It will be clear that I have described double-ported valve structures which lend themselves to ready assembly and fabrication of parts. Of particular importance is the feature of providing accurately positioned guides supporting a single-piece valve stem at points close to operating positions of the valve members and on both sides of these members. Inaccurate seating of either valve disc is virtually impossible, for there can be no misalignment of the operating parts. In the case of Fig. 1, misalignment of actuator 30, with respect to the valve stem 28, due to a gasket 48 of non-uniform thickness, or due to unevenness in the take-up of the bolts 52, cannot adversely affect operation of the valve. Similarly, in Fig. 2, misalignment of actuator 130 with respect to valve stem 128, non-uniform thickness of gasket 148, or unevenness in the take-up of the bolts 151, cannot impair valve efficiency.

As a further feature, my improved valve constructions provide a means for ready access to the valve member or members so as to remove or replace the same with a minimum of dismantling and without disturbing the assembly or setting of the actuating means. A small bonnet is all that needs to be removed, and yet fully aligned, guided support is achieved on both sides of the valve member. Additionally, my construction substantially eliminates any tendency of the valve stem to stick in its guide, by providing a guide which is always lubricated.

While I have described my invention in considerable detail, in connection with the preferred forms shown, it should be understood that various modifications may be made without departure from the invention as defined in the claims which follow.

I claim:

1. In a valve, a body having two ports spaced on the same upstanding axis, the upper one of said ports being larger than the lower, separate valve members for said ports, an upstanding stem rigidly supporting said valve members in spaced relation and extending upwardly and downwardly from said valve members, the lower of said valve members being smaller than the upper and of a size to pass through said upper port, said body having a valve-member access opening with a cylindrical counterbore above said upper port and larger than said upper valve member, whereby a complete valve-member-and-stem assembly may be bodily inserted through said opening, said assembly including separate cylindrical stem-guide portions above and below said valve members, the diameter of the stem-guide portion below said valve members being smaller than the opening of the lower port, said body having a cylindrical bore beneath the lower port and smaller than the opening of said lower port, said bore and counterbore and ports being on the same upstanding axis, whereby said bore and counterbore and ports may be simultaneously bored in a single machining set-up for assured concentricity, means concentrically referenced to said bore and counterbore for concentrically guiding said upper and lower stem-guide portions, a condensate enclosure surrounding said lower bore and projecting downwardly from said body, pressure-responsive actuating means forming the lower end of said enclosure and connected to the lower end of said stem, said lower concentrically referenced means having a stem-guide bore located relatively remote from said valve members and relatively near said actuating means and being the only guide support for the lower part of said stem, and means providing communication between said condensate enclosure and said lower reference means.

2. A valve according to claim 1, in which said lower concentrically referenced means is a downwardly projecting guide tube fixed to said body and projecting downwardly within said enclosure, said tube including said stem-guide bore at the downwardly projecting end thereof.

3. A valve according to claim 1, and including a coil spring surrounding the lower one of said stem portions and urging said actuating means in the downward direction.

References Cited in the file of this patent

UNITED STATES PATENTS

| | | |
|---|---|---|
| 147,292 | Steele | Feb. 10, 1874 |
| 320,273 | Munzinger | June 16, 1885 |
| 361,796 | Watts | Apr. 26, 1887 |
| 647,706 | Robertshaw | Apr. 17, 1900 |
| 1,173,913 | Anderson | Feb. 23, 1916 |
| 1,195,658 | Cockburn | Aug. 22, 1916 |
| 1,213,582 | Brown | Jan. 23, 1917 |
| 1,235,541 | Anderson | Aug. 7, 1917 |
| 1,894,391 | Barrett | Jan. 17, 1933 |
| 2,115,998 | O'Connor | May 3, 1938 |
| 2,295,208 | Grove | Sept. 8, 1942 |

FOREIGN PATENTS

| | | |
|---|---|---|
| 1,281 | Great Britain | Jan. 12, 1884 |